US007016356B1

(12) United States Patent
Profumo et al.

(10) Patent No.: US 7,016,356 B1
(45) Date of Patent: Mar. 21, 2006

(54) METHOD AND SYSTEM TO ASSIGN TRANSMISSION BANDWIDTH IN BOTH RADIO AND PON ATM P-MP SYSTEMS

(75) Inventors: Alberto Profumo, Milan (IT); Claudio Santacesaria, Milan (IT); Paolo Baldo, Cerano (IT); Luigi Lovino, Milan (IT)

(73) Assignees: Italtel SpA, Milan (IT); Siemens Information and Communication Networks S.p.A., Milan (IT)

( * ) Notice: Subject to any disclaimer, the term of this patent is extended or adjusted under 35 U.S.C. 154(b) by 752 days.

(21) Appl. No.: 09/586,564

(22) Filed: Jun. 2, 2000

(51) Int. Cl.
*H04Q 11/04* (2006.01)

(52) U.S. Cl. .................................. 370/395.4; 370/468
(58) Field of Classification Search ............. 370/241.1, 370/355, 389, 395.1, 395.4, 395.5, 395.7, 370/442, 443, 458, 465, 468, 395.41
See application file for complete search history.

(56) References Cited

U.S. PATENT DOCUMENTS

| | | | | |
|---|---|---|---|---|
| 5,392,280 A | * | 2/1995 | Zheng | 370/353 |
| 5,684,791 A | | 11/1997 | Raychaudhuri et al. | |
| 5,978,374 A | * | 11/1999 | Ghaibeh et al. | 370/395.43 |
| 6,064,652 A | * | 5/2000 | Buckland et al. | 370/235 |
| 6,324,184 B1 | * | 11/2001 | Hou et al. | 370/468 |
| 6,598,086 B1 | * | 7/2003 | Bell et al. | 709/233 |
| 6,813,255 B1 | * | 11/2004 | Goderis et al. | 370/335 |

FOREIGN PATENT DOCUMENTS

| | | |
|---|---|---|
| EP | WO9735410 | 9/1997 |
| EP | 0804006 | 10/1997 |

OTHER PUBLICATIONS

Narasimhan et al. "Data Link Control Protocols for Wireless ATM Acess Channels". IEEE. Nov. 6, 1995-Nov. 10, 1995. pp. 753-757*
Tajima et al. "Asymmetric ATM-PON interface compliant to ITU-T/FSAN Standard for global optical acess systems". IEEE. Oct. 18-22, 1999. pp. 27-30.*
Winstanley, et al., Permit Delivery Rates of an ATM Cell Based Access Network MAC Protocol; IEE Eleventh UK Teletraffic Symposium, Performance Engineering in Telecommunication Networks, Mar. 23-25, 1994, pp. 8A/1-9; XP-002104951.

* cited by examiner

*Primary Examiner*—Ricky Ngo
*Assistant Examiner*—Derrick W Ferris
(74) *Attorney, Agent, or Firm*—Birch, Stewart, Kolasch & Birch, LLP

(57) ABSTRACT

A method and a system are described to assign bandwidth in a point-to-multipoint ATM transmission system, comprising a centralized unit or Master Station (MS) and a plurality peripheral stations (PSs), in particular to assign transmission bandwidth on the channel from PSs to MS, by assigning transmission abilitations in defined time slots sending messages called Grants on the channel from MS to PSs. The system assigns bandwidth in the system using three different bandwidth allocation modalities, a static modality, and two separate dynamic modalities.

6 Claims, 6 Drawing Sheets

METHOD AND SYSTEM TO ASSIGN TRANSMISSION BANDWIDTH IN BOTH RADIO AND PON ATM P-MP SYSTEMS

BACKGROUND AND FIELD OF THE INVENTION

The invention relates to the definition and the exploitation path of a Medium Access Control (MAC) protocol to be applied in wideband point-to-multipoint transmission systems, that rely on optical physical layer (Passive Optical Network) or radio physical layer and operate according to the time division multiple access schema and ATM transport format.

Among access techniques in telecommunication networks, point-to-multipoint on radio or physical channel are having a great market success due to their indubitable advantages in terms of flexibility and costs compared to point to point solutions.

As well known by skilled in the art, this kind of systems is characterised by the presence of a Master Station (MS) and a certain number of Peripheral Stations (PS): downstream channel (from MS to PS) is broadcast while upstream channel (from PS to MS) is used with time division multiple access (TDMA) under MS control.

To properly realise transmission from many PS to the single MS on a single channel, a point-to-multipoint system needs a solution to allow effective sharing of the single communication channel and to avoid that each PS transmission could interfere with others'.

The solution for physical mean sharing is generally based on time division multiple access, that is the single communication channel used for transmission from PSs to MS is divided into time slots defined on the basis of timing diffused on the broadcast downstream channel.

Each time slot is reserved to transmission from a single PS that is activated in that particular slot by a message, called 'grant', sent by the MS on the downstream channel.

MAC functionality, located in the MS, is in charge of generating these 'grant' messages in order to satisfy bandwidth requirements of PSs.

In an ATM system, moreover, MAC functionality has to be able to guarantee that bandwidth assigned to each PS allows to fulfil quality of service parameters of each connection belonging to different classes of traffic defined in the international specifications.

In specialised literature and patent specifications various TDMA solutions have been proposed; they can be divided into two categories:
- extremely specialised ones, based on physical channel properties and little reusable even in different versions of the same equipment; these solutions are often enough simple, still being very sensitive to round trip delay, channel capacity and error probability.
- flexible solutions, very complex in hardware but with indubitable advantages of total adaptivity.

We can quote some of the most interesting experiences about these techniques. In the CEE financed project "RACE 2024 Broadband Access Facilities" an experimental system to access a passive optical network has been implemented. In this system the MS (optical line termination) manages upstream channel by the generation of 'grants' dedicated to single users connected to peripheral stations. Complexity was high due to the exchange and treatment of queue status and the system was not able to optimise transportation of ATM connections carrying narrowband services like, for example, telephone calls.

A different approach, taking into account narrowband services, was based on a MAC protocol that allowed allocation of the bandwidth to services on a semi-permanent basis, but unfortunately treated in the same manner also variable traffic or wideband connections, like, for example, Internet access connections.

Technique described in the Italian patent 01286424, titled "Metodo di gestione dell'accesso ad una rete ottica passiva (PON) in un sistema PON di tipo TDMA", introduced major improvements in comparison with previous techniques allowing narrowband and broadband traffic treatment and, as far as broadband traffic is concerned, giving the possibility to allocate bandwidth in dynamic fashion.

These results have been achieved with some new concepts:
- Use of 'grants' addressing PS and not the user flux with the advantage of letting the PS choosing which user (connection) to serve each time that a grant is received.
- Narrowband and constant bandwidth broadband traffic treatment via a semi-permanent table.
- Variable bandwidth broadband traffic without maximum delay requirements is treated with an algorithm that takes into account the fullness level of queues in the PS to decide PS priority for 'grant' assignment.

SCOPE AND SUMMARY OF THE INVENTION

Object of present invention is a MAC protocol and related realisation modalities, capable of not only serve in adequate manner connections related to narrowband and broadband services with required efficiency, but also to satisfy some traffic parameters of broadband services, differentiating thus, within broadband services, treatment of connections belonging to different traffic classes, but guaranteeing in the meantime efficient use of all available transmission capacity or bandwidth in the channel from PSs to MS.

According to present invention, transmission bandwidth from PSs to MS is assigned by the MS to the PS, following two different modalities.
- static allocation (known technique)
- dynamic allocation An important aspect of present invention is represented by the fact that dynamic allocation is made according to two different mechanisms:
- one mechanism for dynamic guaranteed bandwidth allocation guarantee that PS has always the possibility to be assigned, for certain connections, a certain amount of "minimum guaranteed bandwidth" defined during connection setup phase but allows PS to momentarily free a part of or all this "minimum guaranteed bandwidth", according to two different and concurrent mechanisms that can be separately used and are described below;
- a dynamic mechanism to partition bandwidth that remains available distributes this "available bandwidth" in equal parts among all PSs that have traffic to be transmitted, thus implementing a fairness model perfectly attending criteria specified by standardisation bodies.

As to previously described mechanism of guaranteed dynamical bandwidth allocation, PS can modulate assigned bandwidth according to two modalities: first modality which is on/off, is based on the sending by the PS of an aggregated information about queue status related to those queue which rely on the dynamical bandwidth allocation; this information, indicating whether traffic to be transmitted is present or not can be used by the centralised unit to momentarily inhibit bandwidth assignment to PS that doesn't have traffic waiting to be transmitted in connections with dynamical bandwidth allocation.

Second modality is, instead, based on the sending by the PS of a more detailed information about real bandwidth requirements for guaranteed bandwidth connections and allows centralised unit, on the basis of received information, to change instantaneous bandwidth assignment to that PS on the basis of instantaneous requirements, in order to guarantee efficient statistical multiplexing.

The present invention reaches therefore the target of over-performing known algorithms for bandwidth allocation in terms of efficiency, implementing a simple, robust and flexible MAC protocol for P-MP systems, capable of using in the best way the overhead to exchange information between PSs and MS, but capable in the meantime of guaranteeing support for different ATM classes of traffic, in conformance with existent rules.

The invention defines a MAC protocol suitable for P-MP radio or PON systems, operating on a single communication channel for each transmission direction and based on ATM transport format and TDMA multiple access technique on the channel from PS to MS.

Protocol is able to treat in an optimal fashion bandwidth allocation for ATM classes like CBR and UBR and, through a totally new mechanism, even for different variable bandwidth traffic types with guaranteed minimum (like UBR+, VBR non real time, ABR, GFR, etc.).

MAC protocol proposed in the present invention offer instruments that allow MS to assign to each PS a bandwidth which is evaluated on a instant by instant basis on the basis of state information received by PSs, always guaranteeing respect of traffic parameters and, in particular, of minimum guaranteed bandwidth, defined in the connection setup phase and MS can eventually modulate assigned bandwidth on the basis of state information received by PSs.

According to method proposed in the invention, ATM layer is left the responsibility to guarantee other service parameters, like cell loss probability and delay constraints (that are not treated by the new MAC protocol).

The invention is clearly defined in independent claims 1 and 13. Additional useful characteristics of present invention which are believed to be novel are set forth with particularity in the appended claims.

BRIEF DESCRIPTION OF THE DRAWINGS

The invention, together with further objects and advantages thereof, may be understood with reference to the following description, taken in conjuction with the accompanying drawings, and in which.

DESCRIPTION OF SOME EMBODIMENTS OF THE INVENTION

Figure 1:
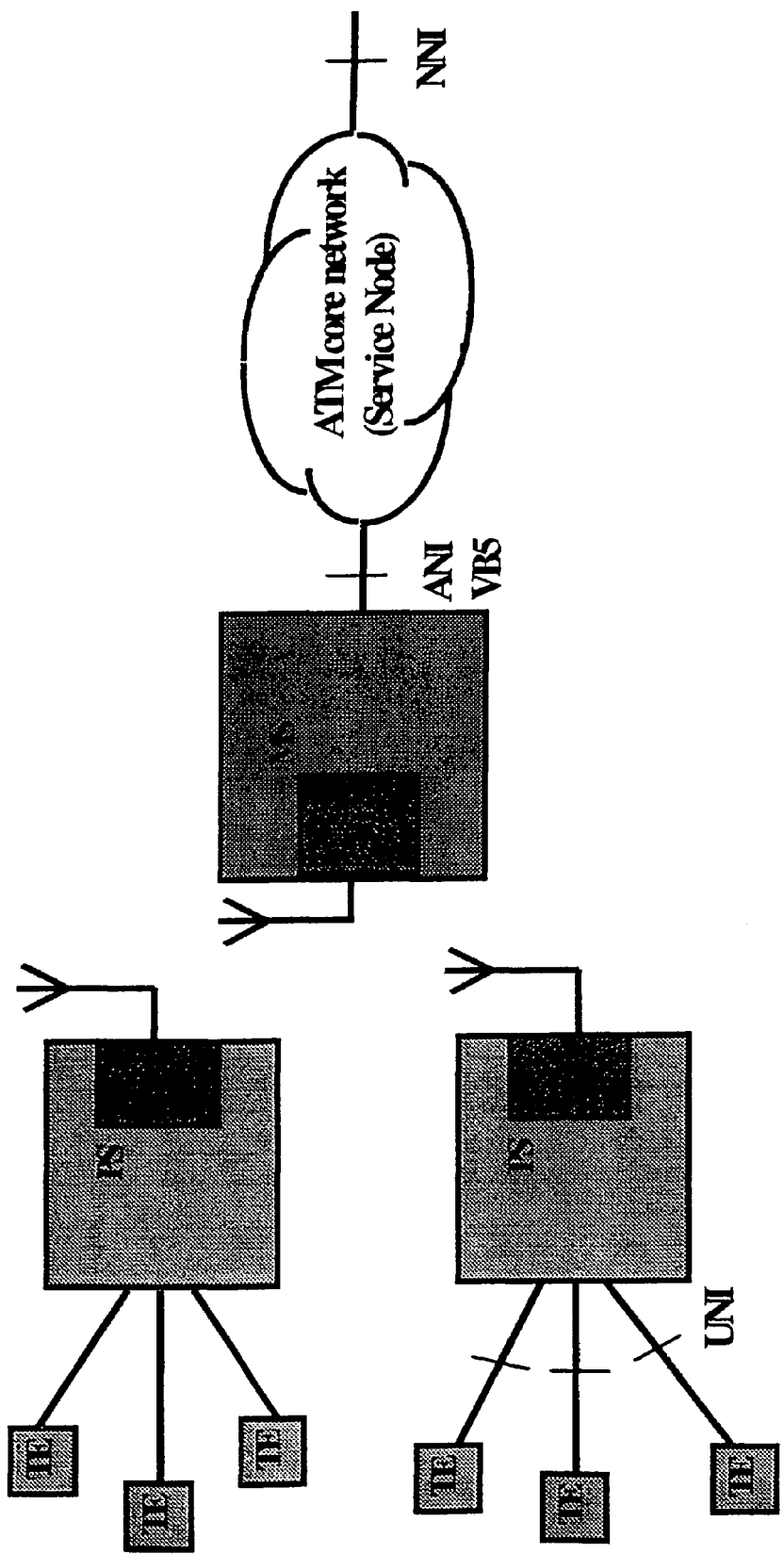
FIG. 1 is a reference scheme of a P-MP system, in the case of radio physical layer.

Reference scheme is shown in FIG. 1.
Used acronyms are the following:
PS: Peripheral station
MS: Master Station
Relevant entities are defined in the following way:
MAC Master Processor
Localised in the MS, it elaborates information received by PSs and generates messages (grant) to assign upstream transmission in each slot of the TDMA frame to selected PS.
MAC Slave Processor
Localised in the PS, it provides correct transmission commands, choice of traffic to be transmitted in each slot on the basis of MAC information received and information or messages to be sent to MS.
MAC Protocol
MAC protocol uses messages that are sent in both directions to co-ordinate various functional entities (MS and PS): these messages and their interpretation are called MAC protocol. MAC protocol of current invention, belongs to category of protocols without collision, with centralised controller (MAC Master Processor) that is the only entity which can enable transmission of one or another PS.

Centralised control allows, in fact, avoiding that, after independent decisions, collisions take place that is more than one PS transmit at the same time with the consequence of lost information.

Main requirements of the system hereby described in terms of functionality and protocol as best defined in the following are:

1) flexibility of bandwidth allocation where flexibility is intended as:

capability of varying, as a consequence of commands released by maintenance or control system, bandwidth allocation among various PS, without degrading already active traffic: it can be defined as capacity of bandwidth relocation.

capability to dynamically assign, on the basis of information received by MS about various PS's queue status, each slot to one or another PS: this capability is usually called dynamic bandwidth allocation.

2) capability to support in proper way (QoS respect) various classes of traffic: CBR, UBR, VBR rt, VBR nrt, ABR, UBR+, GFR.

3) capability to operate independently of total channel capacity (from a minimum of 10 Mb/s to a maximum of 150 Mb/s).

4) capability to operate in every condition of distance between MS and PS up to a maximum distance of 20 km.

Bandwidth allocation, that is proper assignment of slot to each PS, can be done in a static way, which is independent of queue status in the PSs, or in a dynamic way which depends on the queue status in the PSs.

To satisfy QoS (Quality of Service) requirements of CBR traffic, static assignment is used; for other types of traffic dynamic assignment is preferred.

MAC functionality must, thus, be able to operate, even simultaneously, in both ways. In the following, MAC messages, an essential part of the protocol are defined.

In MS→UP (downstream) direction the MAC Master Processor must send messages to indicate assignment of each upstream transmission slot. The message that carries assignment information is called Grant.

The number of these messages, in a certain time interval, must be equal to the number of upstream slots in the same interval. Duration of such interval depends on transport modality of the messages.

Grant carry the following information fields:

Type of slot to be transmitted by the PS (user traffic, operation and maintenance, minislot block);

Identification number of the PS (or the PSs) to which slot is assigned (Connection ID or type of traffic is NOT carried).

If messages are grouped and sent in blocks of K, each block of K messages is transmitted before a period in which K upstream slots will be transmitted.

Precise choice of modality to carry Grants in downstream frame is not essential to protocol functionality.

Grant is protected with an error correcting code, because a grant which isn't received or is erroneously receive can cause collisions or wasted slots with the effects of bandwidth waste and potentially an excessive Cell Delay Variation (CDV) fro CBR traffic.

In the upstream direction, each PS sends to the MS indications about (instantaneous) queue status and instantaneous bandwidth need for dynamic bandwidth allocation. This message is called "Request".

Information fields are:
1) Aggregated queue status: the field carries information about queue status in the PS without distinguishing among connections but cumulating information of all ATM connections that use dynamic bandwidth allocation in the PS. Static allocation connections are excluded. This status can be expressed by 1 or more bits.
2) Requested dynamic bandwidth, always less than minimum guaranteed bandwidth defined during connection setup phase, expressed as instantaneous required minimum cell rate or Minimum requested bandwidth of the PS. This second information is optional and is computed by the PS on the basis of internal status (number of active connections of minimum guaranteed bandwidth type and related instantaneous traffic).

This information reaches MAC Master Processor with a certain minimum periodicity, determined by a proper programming of MAC Master Processor, as to guarantee fulfilment of all traffic parameters of active connections.

Request transport can take place with two different and coexistent modalities:
1) piggy-back in traffic slot—in the upstream slot transmission, the PS to which the slot is assigned, transmits a Request as well as user traffic;
2) mini-slot—in special upstream slot assigned through particular grants, one or more PSs transmit only a Request (plus physical layer preamble), usually using only a part of the entire slot, called mini-slot, for each transmission.

As already stated, MS hosts the MAC Master Processor, the block that implements MAC functionalities.

Figure 2:
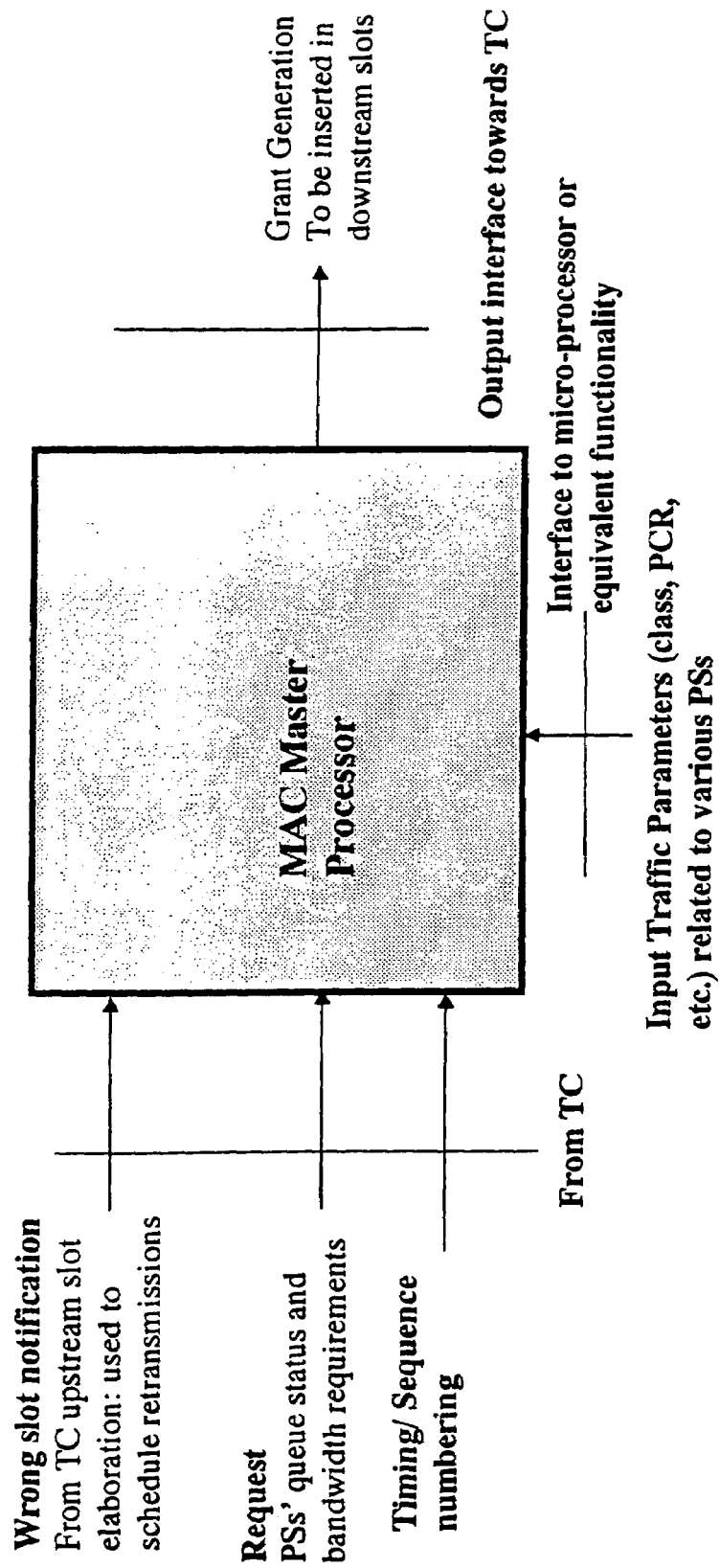
FIG. 2 is a scheme that illustrates interfaces of MAC protocol processor in the MS.

In FIG. 2 functional interfaces of the MAC Master Processor block are shown.

From control/configuration interface traffic descriptors related to the combination of all the connections belonging to each traffic class of each PS are received.

From interface towards Transmission Convergence (TC) layer the following information is transferred:
timing information and frame numbering (useful to generate retransmission grants)
PSs' queue status information received through mini-slot or special field inside each upstream transmission burst.
wrong burst reception notification: used in case of retransmission functionality is implemented.

MAC processor, using these inputs and performing MAC algorithm that is described forward, generates a Grant Stream made of a Grant for each upstream slot.

These Grants are transferred to TC block or functionality in order to be inserted in the proper position in downstream frame.

Insertion modality (grouped or one by one, error correcting or detecting code etc.) is not relevant to scope and functionality of the system in the present invention.

Bandwidth allocation is therefore performed by the MAC Master Processor in the MS, through proper Grant generation in order to guarantee:
static bandwidth assignment (meaning by static that it can be modified by command sent to MAC Master Processor, but non according to PS queue status) of a certain amount of bandwidth to each PS.
dynamic assignment of bandwidth not assigned statically to priority connections. This allocation scheme can be influenced by PS queue status.
ex-equo assignment of bandwidth not assigned with previous mechanism to all the PSs that have traffic in the queue.

Static allocation corresponds to the assignment of a fixed capacity, equal to a constant grant rate, to a certain PS, that is to a certain group of ATM connections with constant traffic profile in input to that PS.

Configuration information for static bandwidth allocation transits through proper maintenance and control interfaces and reaches MAC Master Processor control interface in the MS.

MAC Master Processor is not influenced by the status of the queue related to static allocation connections: for these connections no Request information carrying queue status is transmitted.

PS is informed about this static assignment in order to:
identify ATM connections to insert in highest priority static queue.
control user traffic through a correct policing functionality.

This information can reach PS through a dedicated operation and maintenance channel identified by a special VPI/VCI couple.

At the end of connection setup procedure, MAC Master processor starts generation of Grants related to those static connections.

Static allocation is usually applied to CBR traffic, but it can be used also for VBR real-time and, in principle, it can be applied to UBR traffic with clear inefficiencies.

Static modality must guarantee a continuous Grant generation stream, correspondent to a certain predetermined capacity to each requesting PS.

Each Master Processor is thus capable to generate up to M Grant streams in static modality, where M is the total number of PSs served by the same MAC Master Processor.

Figure 3:
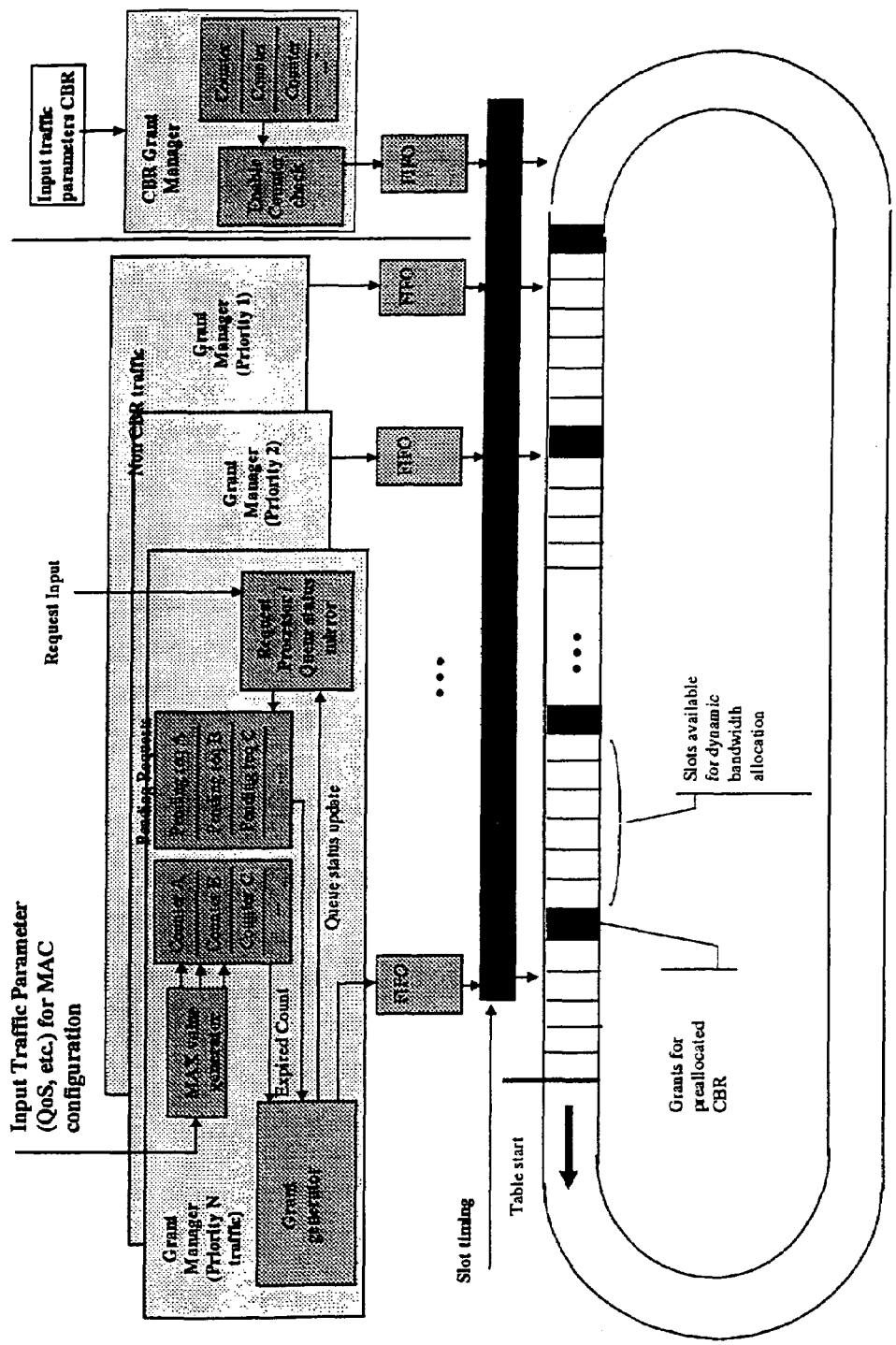
FIG. 3 is a scheme illustrating generic mechanism of grant generation to be used in the MAC protocol processor in the MS.

Grants needed to statically assign a certain constant capacity to a certain PS are inserted in a table in proper positions; the table is shown as a circular stripe in FIG. 3 to indicate that the table is cyclically scanned.

The position inside the table is decided by an algorithm whose task is to resolve conflicts if more than one PS have contemporary right to a certain slot assignment; the algorithm assigns subsequent and adjacent slot to the various PSs thus introducing a Cell Delay Variation which is acceptable because equivalent to that introduced by an ATM multiplexer.

Grants extracted from the table during cyclical scanning are transferred to the TC interface to be transmitted to the PSs.

Table dimension must be such as to obtain granularity and minimum allocation as requested by system specification.

Each position in the table corresponds to a slot and can contain:
- a statical allocation user traffic Grant for a particular PS
- an Operation and Maintenance Grant for a particular PS
- a Grant for a group of minislots thus addressed to a group of PSs
- an available grant for dynamic allocation (free position)

Dynamic allocation is mainly used for traffic with variable traffic profile.

In FIG. 3 MAC Master Processor functional scheme that implements static/dynamic Grant generation is shown according to present invention.

Functional blocks in FIG. 3 are:

A Priority Scheduler, that selects the right FIFO from which Grant must be extracted in each slot choosing on the basis of FIFO status and priority. Static traffic is the highest priority.

As many Grant Managers as the number of handled priorities.

Slots that aren't assigned statically are dynamically assigned to other traffic types. In the Figure three priorities are shown.

Grant Manager function is repeated for each priority; only one priority will be therefore described in the following.

Request Processor & Queue Status Mirror elaborates Requests sent by PSs for that traffic priority, rebuilding in dedicated registers the mirrored queue status related to each PS.

When the mirrored status indicates the queue of a PS is not empty, a 'Pending request' information related to that PS is active inside the MAC Master Processor. 'Pending request' can't be served until a down-counter associated to that priority of that PS has expired.

This constraint realises an automatic flux control on the upstream traffic in the system. The starting value of the down-counter is such as to generate a grant rate equal to the sum of all the guaranteed rates of all the connections in the PS.

At the beginning the starting value of the counters is chosen at connection setup. During normal operation, with a frequency determined by the MAC Master Processor, the PS, according to its instantaneous state sends a precise request of "Minimum requested bandwidth", which is the new starting value for the correspondent counter in the MAC Master Processor; upon reception of the new Request, MS modifies counter starting value with the new requested value (MS must check that requested value is greater than the value identified during connection setup, that means that PS can only release part of the "Minimum Bandwidth" assigned at the beginning during connection setup phase and not increase that bandwidth); if current counter value is greater than new starting value, current value is set equal to new starting point.

All counters in MS are decremented at each upstream slot time. When a counter after downcounting from starting point to zero, expires, it is re-set to starting point and a binary information called 'Expired Counter' associated to related PS is set to 1. Activation of both 'Expired Counter' and 'Pending Request' at the same time for a particular PS corresponds to the activation of a 'Pending Grant' information associated to that PS.

Another process scans all the Pending Grants at each slot time and inserts in the Grant FIFO a Grant of user traffic type with the identification number of the related PS for each PS that has an active Pending Grant. At the same time the process sets to 0 the 'Expired Counter' information.

Grants are extracted from the FIFO one for each slot that is not reserved to higher priority traffics.

If the counter expires when 'Pending Request' is not active, the counter is re-set to starting value and then it resumes counting, while 'Expired Counter' is set and stays at 1, so that eventual later activation of Pending Request will immediately cause Pending Grant activation.

Counter structure can be used to realise more sophisticated flux control functions, simply varying according to more or less complicated algorithms modality of increment and decrement of the counter itself.

Bandwidth not assigned according to previously described mechanisms (that is when, on Grant generation time, no Pending Grant is active and no static assignment is preallocated) is distributed in equal shares to all the PSs that have at least one cell in queue in any connection which is handled by the dynamic modality (statically handled connections are therefore excluded) and therefore related Grants are assigned cyclically to all the PSs that have an active 'Pending Request'.

If no PS has cells to be transmitted, bandwidth is used to allow sending of additional "minislots", that is the Grant is assigned to a slot period to be used to send minislots when no Pending Request, no Pending Grant and no static allocation Grant are present at a certain slot time.

Minislot grants are assigned cyclically to all the PSs in the system.

Figure 4:
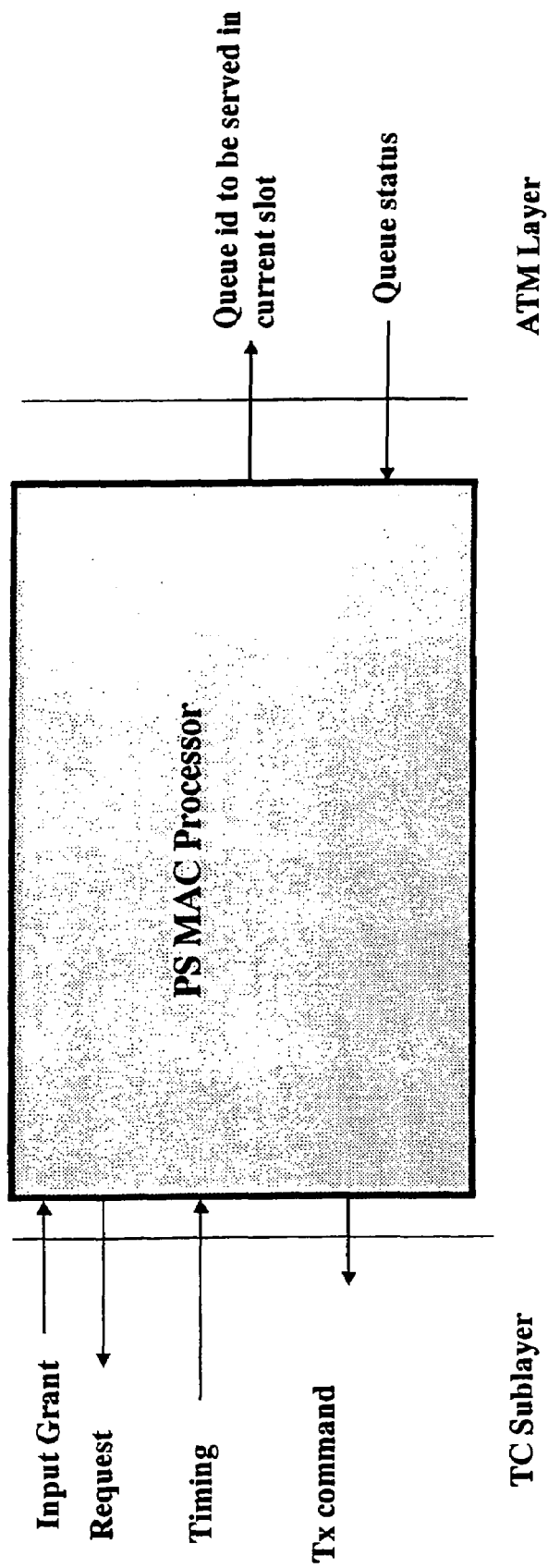
FIG. 4 is a scheme that shows MAC protocol processor interfaces in the PS.

In FIG. 4 PS MAC Processor interfaces towards other UP functionalities are shown. Through interface to Transmission Convergence (TC), the functionality that provides insertion of MAC messages and user data in the packet or frame to be transmitted on the physical channel and extraction of the same information in the reception side, MAC Slave Processor receives the following information:
- timing of transmission slots
- Grants Through interface toward ATM functionalities MAC Slave Processor receives the following information:
- queue status information MAC Slave Processor produces as an output towards TC:
- transmission activation commands in determined upstream slots or minislots
- indication of the type of information to be served in correspondence of each activation command (user traffic, maintenance or mini-slot): user traffic queues associated to different classes of traffic or different connections are assumed to be part of ATM layer which is also responsible for the choice of the queue to be served at each transmission activation command.
- Request messages to be inserted in upstream slots and mini-slots with the correct timing when proper activation commands are activated.

Retransmission functionality can be useful in some conditions and therefore can be optionally added to the MAC system of the invention.

As an example, it is here described a retransmission technique that can be optionally applied to only upstream traffic (the most sensitive to physical channel problems) in the system of the invention.

Considered retransmission technique will handle all the classes of traffic in the same manner.

As well as MAC messages and their contents, that have been previously described, special messages can be defined to implement retransmission: a "retransmission grant" will be added to grant types as well as user traffic, mini-slot and operation and maintenance traffic grant type.

A new downstream message is defined and named "reception acknowledge"; it is inserted in a dedicated field of each downstream slot and carries information on right or wrong reception of the upstream burst that has been transmitted in the upstream slot that immediately precedes the downstream slot in which the acknowledge is inserted.

Acknowledge implicitly carries information on the position of the wrong slot.

Support of retransmission functionality mustn't degrade unacceptably performance of normal traffic and therefore when a cell loss occurs, it must be avoided that:

normal traffic is delayed until retransmission of lost traffic has taken place cell sequence integrity is lost in the MS.

To comply with these requirements, a reordering buffer is included in the MS; the buffer is made of M locations each capable of storing an entire cell.

Buffer is traversed by all the cells receive by MS TC, before they are transferred to other (usually ATM) functionality in the MS. In this manner a constant delay of M cells is introduced on all the upstream connections.

M is chosen so that:

up to K consequent cells can be retransmitted (lower bound);

an unacceptable delay isn't introduced and a too large memory isn't required (upper bound).

When up to K consequent cells are lost, K free positions are left in the reordering buffer; these positions will shift of a place at each slot time towards the end of the buffer.

When a retransmitted cell is received, it is directly inserted in the empty position, passing over all the positions nearer to buffer input.

K consequent cells retransmission doesn't necessarily take place in a single burst of the same length: the single burst would inevitably cause a potentially unacceptable distortion of other traffics (CBR in particular).

It is therefore advisable that K retransmission grants are generated with proper spacing: a grant scheduler handled with maximum priority will be therefore associated to retransmission traffic.

In this way a spacing of J slots between any two retransmission grants will cause the retransmission of K cells to take place in K*J slots.

Reordering buffer shall be dimensioned in $M_{max}$ cell positions in order to allow reconstruction when up to K consequent cells are lost where:

$$M_{max} = K*(J-1) + T_{Round\ Trip\ Max}/T_{Slot}$$

without considering elaboration times.

Figure 5:
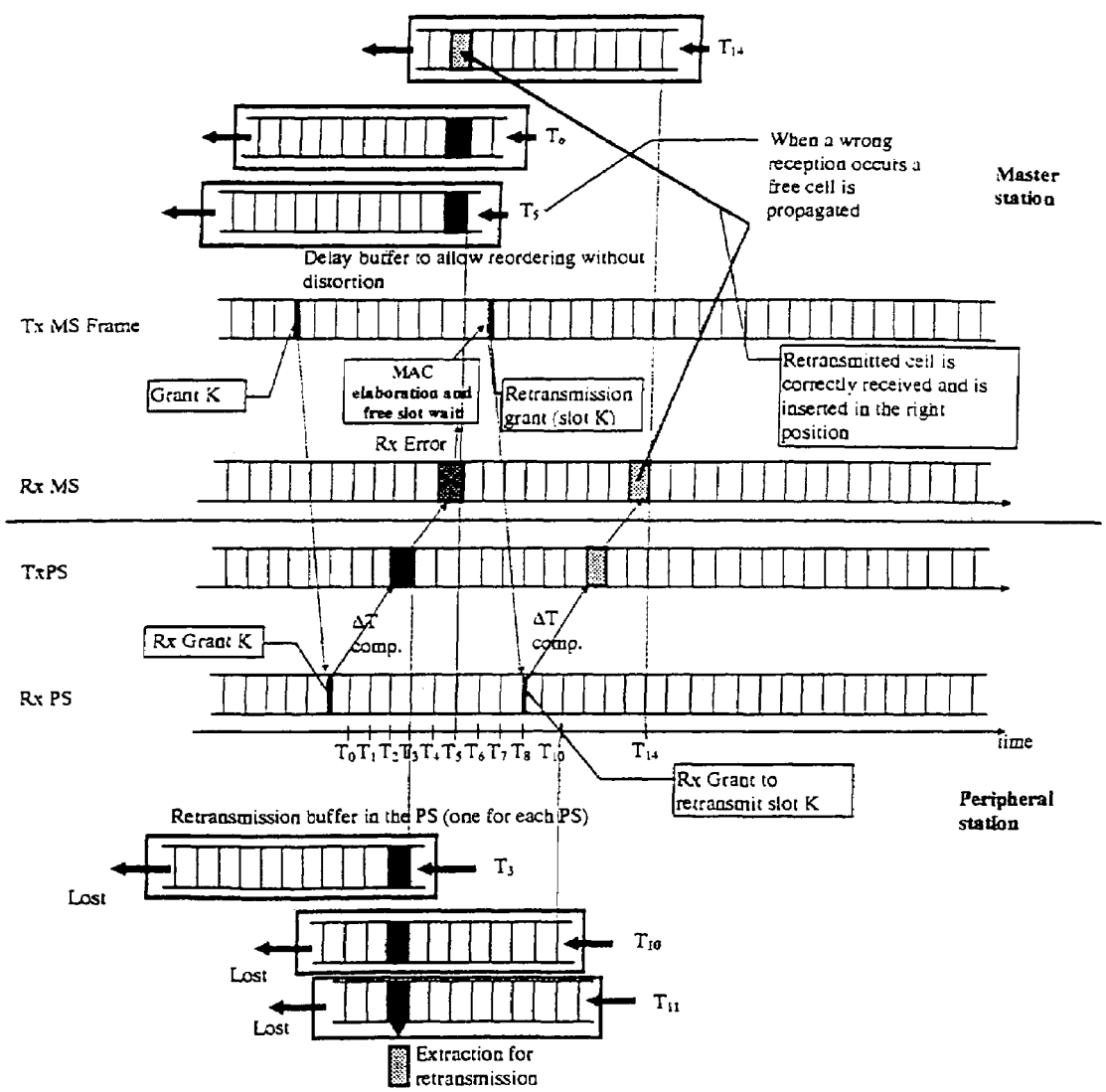
FIG. 5 is a schematic picture of the selective retransmission scheme without traffic distortion.

The functional behaviour is traced in FIG. 5.

When more than K consequent cells are lost, all the cells after the $K^{th}$ cannot be retransmitted (cannot be received in time for reordering).

Figure 6:
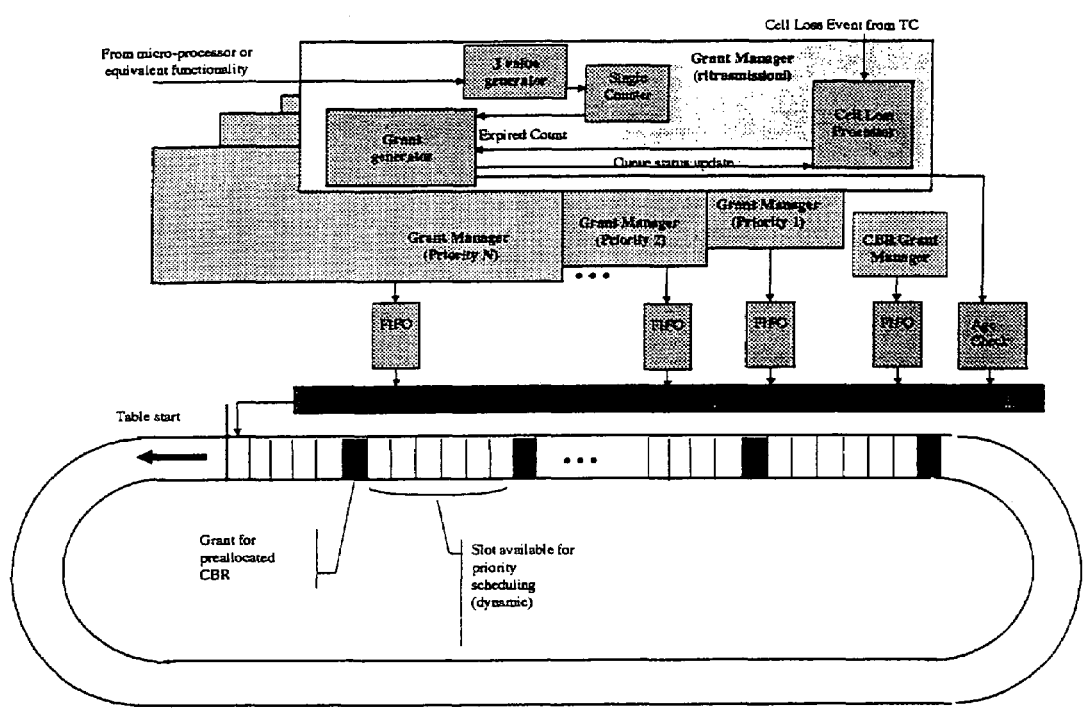
FIG. 6 is a scheme of grant generation mechanism with retransmission included for MS MAC Master Processor.

As MS is able to verify age and thus usefulness of retransmission grants, it's advisable to insert a check through a dedicated block (Age check block in FIG. 6) so that in case of excessive age grant won't be transmitted to the PS.

PS must have a FIFO buffer of the same dimension, in which transmitted cells are stored and shifted at each upstream slot time (if the slot is assigned to a different PS an idle cell is inserted). When a retransmission is requested the PS gets the requested cell from the buffer and sends it over.

The invention claimed is:

1. A method for assigning bandwidth in a point-to-multipoint communications system comprising a master station and a plurality of receiving stations, comprising:

allocating a first amount of bandwidth at setup to a first plurality of the receiving stations via the master station in accordance with a static modality;

receiving at the master station requests for bandwidth from a second plurality of the receiving stations;

in response to a request for bandwidth from each of the requesting second plurality of receiving stations, assigning to every one of the requesting second plurality of receiving stations the requested bandwidth up to a predetermined guaranteed minimum bandwidth; and sharing a remaining bandwidth not assigned in accordance with the static modality and not assigned in response to a request for bandwidth among the requesting second plurality of receiving stations.

2. The system of claim 1 wherein said step of sharing a remaining bandwidth comprises the step of assigning all of a remaining bandwidth to the requesting second plurality of receiving stations.

3. The system of claim 1 wherein said step of sharing a remaining bandwidth comprises the step of sharing a remaining bandwidth among a subset of the requesting second plurality of receiving stations requesting bandwidth greater than the guaranteed minimum bandwidth.

4. A system for assigning bandwidth in a point-to-multipoint communications system including a master station and a plurality of receiving stations, comprising:

a controller for performing the steps of:

allocating a first amount of bandwidth at setup to a first plurality of the receiving stations via the master station in accordance with a static modality;

receiving at the master station requests for bandwidth from a second plurality of the receiving stations;

in response to a request for bandwidth from each of the requesting second plurality of receiving stations, assigning to every one of the requesting second plurality of receiving stations the requested bandwidth up to a predetermined guaranteed minimum bandwidth; and sharing a remaining bandwidth not assigned in accordance with the static modality and not assigned in response to a request for bandwidth among the requesting second plurality of receiving stations.

5. The system of claim 4 wherein said step of sharing a remaining bandwidth comprises the step of assigning all of a remaining bandwidth to the requesting second plurality of receiving stations.

6. The system of claim 4 wherein said step of sharing a remaining bandwidth comprises the step of sharing a remaining bandwidth among a subset of the requesting second plurality of receiving stations requesting bandwidth greater than the guaranteed minimum bandwidth.

* * * * *